United States Patent [19]

Loo

[11] 3,813,647

[45] May 28, 1974

[54] APPARATUS AND METHOD FOR PERFORMING ON LINE-MONITORING AND FAULT-ISOLATION

[75] Inventor: Brian Hum Loo, Brea, Calif.

[73] Assignee: Northrop Corporation, Los Angeles, Calif.

[22] Filed: Feb. 28, 1973

[21] Appl. No.: 336,792

[52] U.S. Cl. ........................ 340/172.5, 235/153 AC

[51] Int. Cl... G06f 11/00, G06f 11/04, G05b 23/02

[58] Field of Search ...................... 340/172.5, 146.2; 235/153 R, 153 A, 153 AC, 153 AK, 151.13, 151.3, 151.31

[56] References Cited

UNITED STATES PATENTS

| | | | |
|---|---|---|---|
| 2,987,704 | 6/1961 | Gimpel et al. | 340/172.5 |
| 3,082,374 | 3/1963 | Buuck | 324/73 |
| 3,257,546 | 6/1966 | McGovern | 235/153 |
| 3,278,920 | 10/1966 | Sargent et al. | 340/213 |
| 3,377,623 | 4/1968 | Reut et al. | 340/172.5 |
| 3,444,528 | 5/1969 | Lovell et al. | 340/172.5 |
| 3,536,902 | 10/1970 | Cochran et al. | 235/153 |
| 3,540,003 | 11/1970 | Murphy | 340/172.5 |
| 3,546,582 | 12/1970 | Barnard et al. | 324/73 |
| 3,573,751 | 4/1971 | DeLisle | 340/172.5 |
| 3,581,074 | 5/1971 | Waltz | 235/153 |
| 3,593,307 | 7/1971 | Gouge et al. | 340/172.5 |
| 3,623,014 | 11/1971 | Doelz | 340/172.5 |
| 3,624,372 | 11/1971 | Phillip et al. | 235/153 |
| 3,624,611 | 11/1971 | Wirsing | 340/172.5 |
| 3,681,758 | 8/1972 | Oster et al. | 340/172.5 |
| 3,702,989 | 11/1972 | Provenzano et al. | 340/172.5 |
| 3,723,868 | 3/1973 | Foster | 324/73 AT |

*Primary Examiner*—Paul J. Henon
*Assistant Examiner*—James D. Thomas
*Attorney, Agent, or Firm*—Sokolski, McCormack & Schaap

[57] ABSTRACT

An electronic monitoring apparatus used in on-line performance monitoring and fault-isolation of complex prime systems through a programmed sequence of parameter measurements based on automatic logical decision functions. The monitoring apparatus which may be connected to external equipment is provided with a mechanism for manual selection of any test point on the external system which is to be measured. In addition, the apparatus includes means for displaying identification of the test point thus measured, the measured value thereof, as well as its low limits or its high limits. A timing control circuit in the apparatus permits measurement and comparison of signals from the external system with stored high and low limit tolerance data on a synchronized basis. The apparatus is capable of examining any of a plurality of parameters through test point selection on a controlled random selection basis. The apparatus also provides means for introducing simulation signals into the external system. Self-check sub-systems are incorporated into the apparatus to assure proper performance, prior to any monitoring and fault-isolation operations.

40 Claims, 10 Drawing Figures

APPARATUS AND METHOD FOR PERFORMING ON LINE-MONITORING AND FAULT-ISOLATION

BACKGROUND OF THE INVENTION

This invention relates in general to certain new and useful improvements in monitoring and fault-isolation, and more particularly, to apparatus and method which are capable of performing on-line monitoring and fault-isolation in complex external systems through a programmed sequence of parameter measurements.

There are several types of monitoring equipment which are available for use in monitoring the performance of external prime systems and isolating fault characteristics therein. These types of equipment include, for example, various electromechanical devices, such as punched tape or magnetic tape readers operating in conjunction with a memory storage and a special purpose central processor. Generally, this type of equipment suffers from a number of disadvantages including low reliability and high power requirements. In addition, the initial costs of these units are quite high, due in part to the complexity of the electromechanical components, as well as relatively large solid state memories employed, and furthermore, the costs of maintaining these types of equipment is quite substantial. Consequently, equipment of this type is economically feasible only when used in a time sharing central monitoring system.

General purpose digital computing systems have often been used in monitoring and fault-isolation activity, but these systems also suffer from several disadvantages as well. These general purpose digital computers are usually quite costly in terms of purchase or lease price and furthermore, require the employment of costly operating personnel for programming functions and the like.

Other forms of monitoring and fault isolation systems have generally relied upon fixed sequence multiplexing apparatus. This type of apparatus is usually quite insufficient for the intended function due primarily to the fact that it lacks on-line decision-making capabilities. Furthermore, these types of systems are lacking in that they can not perform the required functions for monitoring and determining fault isolation in complex prime external systems. Notwithstanding, these fixed sequence multiplexing systems have not been found to be very reliable.

It is therefore the primary objective of the present invention to provide an apparatus for monitoring performance of external prime systems on an on-line basis and isolating fault characteristics in such external systems.

It is another object of the present invention to provide an apparatus of the type stated which accomplishes performance monitoring and fault-isolation through a programmed sequence of parameter measurements based on automatic logical decision making.

It is a further object of the present invention to provide an apparatus of the type stated which includes internal self-checking capabilities to provide high reliability and confidence levels with low maintenance requirements.

It is an additional object of the present invention to provide an apparatus of the type stated which is highly reliable and which is relatively inexpensive to manufacture, maintain, and operate.

With the above and other objects in view, my invention resides in the novel features of form, construction, arrangement, and combination of parts presently described and pointed out in the claims.

GENERAL DESCRIPTION

Generally speaking, the present invention provides an apparatus and a method for automatically monitoring signals derived from a plurality of test points on an external system to be tested and isolating fault characteristics therein. The apparatus comprises means for introducing simulation signals with respect to the system to be tested in order to generate test point signals therefrom. A selector switching means is included in the apparatus for selectively coupling the generated test point signals at a plurality of input connections to a single output. A converter means is connected to the output of this selector switching means for converting the signals, in analog or pulse rate form, to digital data. A memory means, preferably in the form of a read-only-memory, is provided for storing pre-established tolerance data for the signals at the respective test points. A comparator means, preferably in the form of a digital comparator, is operatively connected to the memory means as well as to the converter means for comparing the digital data output of the converter means with the stored tolerance limit data.

A timing and control means is operatively connected to the selector switching means and the memory means for causing the selector switching means to couple the test point signals from the input connections to the converter means in sequence and for causing the memory means to introduce tolerance limit data to the comparator means synchronized with the corresponding digital data introduced to the comparator means from the converter means. Preferably, this introduction of data on the synchronized basis will occur in a sequencing rate of at least in the order of fifteen to several hundred test points per second. In addition, the apparatus includes instruction means which is operatively connected to the comparator means for determining which of several possible test points to be measured next, depending on whether a signal is within tolerance or out of tolerance. A presentation means, in the form of a display mechanism, is operatively connected to the memory means for producing a GO condition or a NO-GO condition depending on the respective determinations by the comparator means.

In a preferred aspect of the present invention, the means for introducing simulation signals with respect to the system to be tested, is a test signal generator. Also, signal conditioners and transducers are connected to the test point lines from the external equipment for properly conditioning the signals in an analog or pulse rate form and for further processing in accordance with the present invention. A scaling amplifier is also preferably interposed between the analog-to-digital converter and the selector switching means, and this analog-to-digital converter operates in parallel relationship with a pulse rate detector.

The apparatus of the present invention also preferably includes manual means for examining tolerance limit data from the memory means one test point at a time, and at locations in the memory means corresponding to the respective test points. As indicated previously, the presentation means is a visual display means which is capable of providing a visual display of the GO or NO-GO conditions. This visual display will normally take the form of one or more display members such as light emitting diode displays. In addition, the apparatus preferably includes at least one display member for indicating the magnitude sign, and engineering units of a signal at a test point, and a display for indicating the identification of the test point corresponding to a NO-GO condition.

The memory means used in this apparatus of the present invention includes a means for storing the pre-established low tolerance limit data and a pre-established high tolerance limit data for the test point signals. Furthermore, this memory means comprises a read-only-memory as indicated, and includes a control function data section and a section which contains the high tolerance limit data and the low tolerance limit data.

The timing and control means generally includes a timing pulse generator which generates a plurality of separate pulse trains representing operating conditions. In addition, this timing control means includes a sequence control circuit which receives these last name pulse trains and also receives signals from the instruction means to produce output timing control signals. A branch/search circuit is also included in the timing and control means to initiate and control of branching to a destination test point as designated by the instruction means and memory means, or otherwise searching pursuant to a test point selected by manual means.

The apparatus of the present invention is unique in that it is capable of monitoring signals from plural level test points, i.e., branch circuits, where certain of the test points are major test points and certain of the test points are sub-test points. This apparatus includes means for automatically monitoring sub-test points associated with the major test points when any such major test point renders a NO-GO condition.

The sequence control circuit which forms part of the timing and control circuit includes a gating matrix which receives a plurality of operation signals such as clock signals, stimuli generation signals, analog-to-digital conversion signals, branch/search signals and the like. This matrix is connected through a control flip-flop to a gating circuit and then to the memory. In addition this control flip-flop is connected to a sequence counter which is, in turn, connected to another gating circuit forming part of the timing and control circuit in a manner to be hereinafter described.

The branch/search circuit mentioned above also includes a digital multiplexer and which receives a binary address from the memory and the selected search address introduced at the control panel. In addition this multiplexer also receives a branch/search initiation signal. The outputs of the multiplexer are connected to a digital comparator which receives a signal from the memory. This output signal from the digital comparator is then gated through a gating structure to a search control flip-flop which also receives the branch or search initiation signal to initiate the search or branch control signal.

In accordance with this construction, the apparatus of the present invention is capable of monitoring and examining a plurality of functions through selected test points by proper selection of the test point. In this sense, the apparatus of the present invention is capable of operating on a controlled random selection basis, that is, it is capable of skipping several test points of the same level such as several major test points or several minor test points in a branch and examining other test points in the branch. This random selection is performed in a logical sequence based on previous GO/-NO-GO decisions without examining every test point in sequence.

The apparatus of the present invention also includes internal test checking means for monitoring various components of the system for proper performance. This test checking means actually comprises two internal test checking sub-systems, the first of which includes a signal switching source in the selector switching means operable in connection with a test signal generator. This first test checking system enables a measurement capability check of various components in the system, such as power supplies and the like. A plurality of switch means in the selector switching means, and which are automatically actuable, are operatively connected to the signal source such as the signal generator, and upon actuation, will initiate a test check of any one or more of the components.

The second internal test sub-system includes a logic malfunction indicator circuit which is connected to the instruction means described above and to the timing control circuit. The logic malfunction indicator circuit may also be connected to the various other components in the system. This latter testing sub-system is provided for conducting performance tests within the monitoring apparatus during the course of the monitoring operation. This sub-system, which includes the logic malfunction indicator circuit in the form of a gating matrix, receives timing signals from the timing and control circuit and instruction functions from the instruction logic. In this way this sub-system permits a responsive action to a generated function. Furthermore, this latter circuit also includes a driver for operating indicator lights to provide visual indication of a malfunction.

The present invention also provides a method of automatically monitoring signals at a plurality of test points on external equipment to be tested. This method operates in accordance with the apparatus previously described above and is highly effective in that it requires a minimum amount of manual attention. This method can be described in general terms as a method for automatically monitoring signals at a plurality of test points on a system to be tested. In accordance with this method, test point signals are received from the external system and selectively coupled for converting selective ones of the signals to digital data format. Furthermore, pre-established tolerance data is compared with the digital data representing the test point signals. These test point signals are selectively coupled in sequence and compared with the tolerance limits on a synchronize basis. Thereafter, a GO or NO-GO condition can be presented based on this comparison. Finally, the process of the present invention may include the automatically checking certain of the aforesaid steps for proper performance.

DRAWINGS

Having thus described the invention in general terms, reference will now be made to the accompanying drawings which illustrate a preferred embodiment of the present invention, and in which:

DETAILED DESCRIPTION

Figure 1:
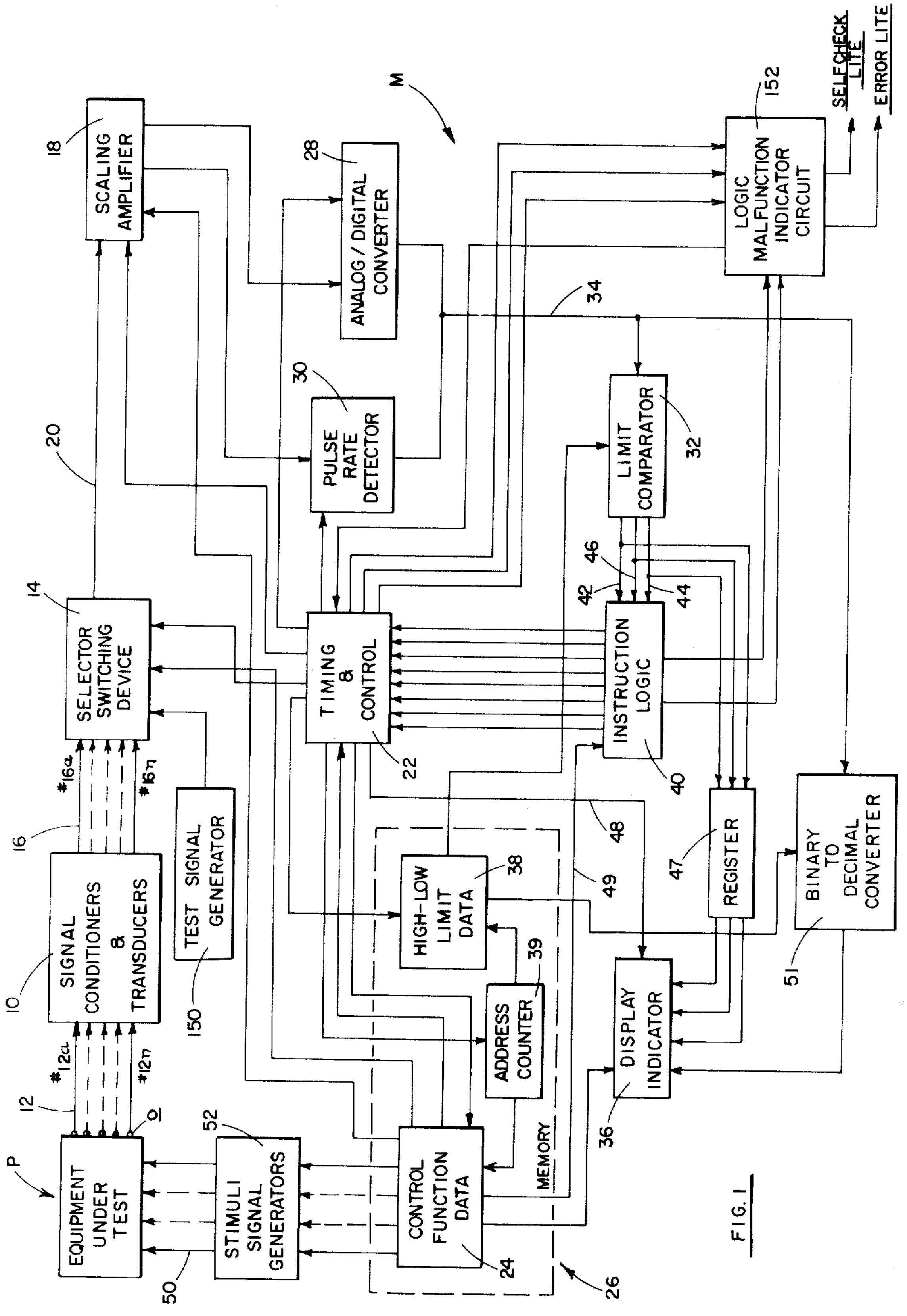
FIG. 1 is a schematic view, in block diagram form, of the electrical circuitry which forms part of the monitoring apparatus of the present invention.

Referring now in more detail and by reference characters to the drawings which illustrates a preferred embodiment of the present invention, FIG. 1 designates a monitoring apparatus M which is illustrated in schematic block diagram form. The apparatus M is also shown as being connected to an external system often referred to as "prime external equipment" P under test in which monitoring and fault-isolation is being performed. The equipment P may take any of a variety of forms and may constitute electrical equipment, such as complex radar units or the like, mechanical equipment, and chemical processes or the like. In the latter two forms of external equipment, necessary sensors and signal conditioning circuitry (to be hereinafter described) are employed.

The prime external equipment P being tested will generally include a plurality of test point outputs at which points the monitoring and fault isolation can be performed, as for example, one of several channels selected for operation in an air search radar unit. Alternatively, the test point outputs can take the form of various outputs on full power or half power operation in mechanical, electrical, or electro-mechanical systems. In the first case, such as with a radar unit, the selected channel being monitored is sensed so those test points connected to associated circuit functions not being used, can be exempted from the monitoring procedure. In the second example, the criterion, or otherwise the limits, of a GO NO-GO decision must be changed in order to provide a valid performance assessment in the monitoring operation.

The monitoring system M generally comprises signal conditioners and transducers 10 which are illustrated in schematic form, inasmuch as this type of equipment is generally conventional and commercially available. The transducers are selected to provide the proper signal input to the apparatus M in response to the type of external equipment P which is being monitored. The signal conditioners operate in conjunction with the selected transducers in order to provide the desired signal for use in the system M. These signal conditioners and transducers 10 would be connected to the external prime equipment P at the respective test points *o* through a plurality of test lines designated as $12_a$ through $12_n$ in FIG. 1. Typically, a separate test line 12 will be provided for each test point.

The signal conditioners and transducers 10 have outputs connected to a selector switching device 14 over signal lines designated as $16_a$ through $16_n$ in FIG. 1, and which will carry either D.C. signals or pulse rate signals, depending on the signals generated at the respective test points *o*. The number of signal lines 16 will be at least equivalent to the number of output lines 12.

The selector switching device 14 may be in the form of one or more printed circuit cards, each of which is operatively connected to and will select one of the individual signal lines 16. The selector switching device 14 also receives the various signals in parallel, and decoding logic (not shown) in the selector switching device 14 selects one of the input signals on any one pair of the signal lines $16_a$ through $16_n$. The decoding logic is constructed and operates in conjunction with a timing circuit hereinafter described, so that signals on only one of the signal lines 16 is selected at any point in time.

Figure 5:
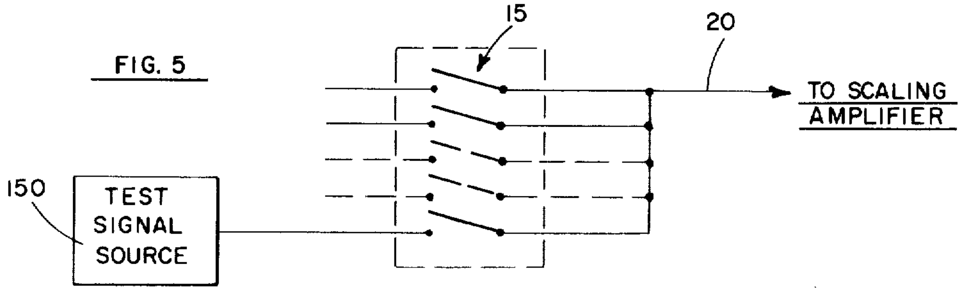
FIG. 5 is a schematic view showing a portion of the switching mechanism forming part of the selector switching device in the circuit of FIG. 1, and the test signal generator operable therewith.

Referring to FIG. 5, it can be seen that the selector switching device 14 also includes a plurality of automatically actuable switches 15 which are operable by the decoding logic in the selector switching device 14. In this case the switches 15 are operable so that only one of the switches 15 is closed at any point in time, such that only one of the test point signals is being examined at any point in time. In this construction the switches 15 operate as a type of multiplexer. Further, the number of switches 15 would be at least equal to the number of test points being examined on the external equipment and hence at least equal to the number of signal lines 16.

The single selected signal associated with the test point *o* being measured on the external equipment P is transferred from the selector switching device 14 to a scaling amplifier 18 over a conductor 20. The scaling amplifier 18 also receives a timing control signal from a timing and control circuit 22 and a control function data signal from a control function data section 24 forming part of a high speed memory 26; the memory 26, as well as control function data section 24 also being described in more detail hereinafter. The scaling amplifier 18 per-se is generally conventional in its construction, and is therefore, not described in any further detail herein. However, the scaling amplifier 18 generates an output in the form of an analog signal which is introduced to an analog-to-digital converter 28, and another output to a pulse rate detector 30, in the manner as illustrated in FIG. 1.

The scaling amplifier 18 provides a single-ended output derived from common output lines of various switches, the latter selecting the various test signals. This amplifier 18 is also effective to scale the signals received from the selector switching device to a preselected range.

The analog-to-digital converter 28 is capable of generating the test signals to be used in a comparison operation, hereinafter described, and employs a conventional method of successive approximation to produce an 11 bit digital number corresponding to the sign and value of the analog signal to be converted. The most significant bit if a binary one, indicates a positive polarity and if a binary zero, indicates a negative polarity. Conversion is initiated by a timing signal from the timing control circuit 22. The analog-to-digital converter 28 will convert the D.C. signals from the amplifier 18 to a binary encoded signal. In this connection, it can be observed that the analog-to-digital converter 28 and the pulser rate detector 30, as well as the selector switching device 14, receives timing inputs from the timing control circuit 22.

The binary signal output from the analog-to-digital converter 28 is introduced into a binary limit comparator 32 over an output line 34 at a selected binary bit rate. The outputs of the pulse rate detector and the analog-to-digital converter are ultimately displayed on a display control and indicator 36 in a manner to be hereinafter described in more detail. The pulse rate detector 30 also receives an input from the scaling amplifier 18 as previously described. Either the pulse rate detector 30 or the analog-to-digital converter 28 will provide an output to the limit comparator 32 depending upon the selected measurement and desired output.

The analog-to-digital converter 28 will generally provide a binary output, preferably in the form of an offset binary data format, which is capable of providing polarity and amplitude indications of a measurement. On the other hand, the pulse rate detector 30 will accept a stream of input pulses and is capable of converting the rate measurement to binary data as opposed to an amplitude measurement. This is usually desirable where the amplitude of the signal is known, and it is desired to determine the frequency rate of the signal. The actual employment of either the pulse rate detector 30 or the analog-to-digital converter 28 is determined by the memory 26 depending upon the test point which is being monitored.

The limit comparator 32 and binary to decimal converter (hereinafter described) both receive inputs from a high-low limit data section 38 contained in the memory 26 in the manner as illustrated in FIG. 1. In the preferred form of construction, the limit comparator 32 may constitute both a magnitude and a sign comparator. This comparator 32 is operable in parallel format and is capable of comparing both the high limit data and the low limit data from the data section 38 in the memory 26.

The data contained in the memory 26 exists in 11 bit word formats where ten of the bits constitute magnitude data and the eleventh bit is a sign bit. In the comparison operation, the 11 bit high limit word is compared with the measured data first, and then the low limit is also compared with this measured data. The high-low limit data section 38 in the memory 26 provides the threshold test point limits, that is the threshold high and low limits and consequently, the limit comparator 32 will determine if the test point value exceeds the high limit or the low limit. These high and low threshold limits are supplied from the memory 26 to the limit comparator 32 in synchronism with the measured data. A decision is then made in the limit comparator 32 which determines if the analog value of the signal from the analog-to-digital converter 28, in the form of a binary word, is greater or less than the threshold high and low data limits from the memory 26.

The memory 26 is designed to store all of the information necessary for processing all of the test points which may be monitored on the external equipment P. The monitoring apparatus M of the present invention is capable of operating with serial or random access memories such as read/write memories, but preferably with read-only-memories. The exact type of memory selected will depend primarily on the monitoring requirement of the prime external equipment P, although, it has been found that the read-only-memory is by far the most suitable for use in the present invention. The size of the memory will depend on the total number of test points to be measured.

Commercial memory control circuits may be used to perform the functions of controlling memory access of appropriate 64 bit test point information during incremental, branching, or test point searching operations. Generally, this control circuit would include a one or more bi-stable elements, such as flip-flops, and associated gating which enables an address counter, such as "memory address counter" 39 capable of counting of up to 11 bits, to read and provide address information of up to eleven bits. Various timing signals from the timing control circuit 22 to the high-low limit data section 38 and the control function data section 24, as well as the address counter 39 of the memory 26 provide for address control in a manner to be hereinafter described. The address counter 39 also generates outputs to the control function data section 24 and the limit data section 38 in the manner as illustrated in FIG. 1. However, it should be observed that timing signals will reset or increment the memory address counter 39. The memory outputs are 64 bits in parallel and remain static during their utilization by enabling an inhibiting of the address counter 39. The parallel memory output is generally preferred inasmuch as the additional storage registers are not required and in addition memory control circuits can be used in the application thereof. The actual memory organization employed in the present invention is more fully described in detail hereinafter.

The limit comparator 32 is provided with "high", and "low" and "normal" outputs which are introduced into an instruction logic, or so-called "instruction circuit" 40, receiving these signals over a "high-low limit" line 42. The instruction logic 40 also receives a GO or NO-GO decision over a GO-NO/GO line 44 and a polarity signal over a polarity line 46. These outputs from the limit comparator are also introduced into a storage register 47 which may be a sixteen bit or greater shift register. In another form of the invention the register 47 may comprise three serial input-output shift registers 47. The first line 42 will normally carry the high-low magnitude information, the second line 44 will normally carry the GO or NO-GO decision and the third line 46 will normally carry the polarity of the magnitude information. The registers 47 are also provided with three outputs connected to the display circuit and indicators 36 and which three outputs carry the same information carried on the lines 42, 44 and 46. The registers 47 will only temporarily hold this information and which will be introduced into the display control and indicator circuit 36 upon receipt of a timing signal from the timing and control circuit 22 over a timing display line 48.

The instruction logic 40 determines the GO/NO-GO status of the current measurement based on outputs of the comparator 32 previously described. The instruction logic 40 also receives a control input over an instruction control line 49 from the control function data section 24 of the memory 26. This latter input provides pre-programmed sequencing information to the instruction logic 40, as well as branching instructions, to permit the monitoring of the various major and sub-test points based on the GO/NO-GO status of the test point just measured.

A binary-to-decimal converter circuit 51, generally of conventional construction, is interposed between the display indicator 36 and the common output line of the pulse rate detector 30 and the analog-to-digital converter 28 in the manner as illustrated in FIG. 1. In essence, the input line 34, is introduced into the binary-to-decimal converter 51, in order to convert either the pulse rate information or the binary information to the decimal format for display purposes. Furthermore, the three output lines 42, 44 and 46 from the limit comparator 32 are ultimately connected to the previously mentioned storage register and hence to the display circuit 36, as also illustrated in FIG. 1.

Test signals are introduced into the prime external equipment P at desired test points thereon, over test point signal lines 50 which are connected to outputs of a test signal generator 52. This test signal generator 52, is designed with signal generating characteristics which depend on the particular type of external equipment under test. This generator 52 will develop the test signals or so-called "simulation" signals for introduction into the prime external equipment P under test. By further reference to FIG. 1, it can be observed that the test signal generator 52 also receives a series of outputs from the control function data section 24 of the memory 26. In like manner, the control function data section 24 generates outputs to the timing control circuit 22, the selector switching device 14, and the scaling amplifier 18, also in the manner as illustrated in FIG. 1. In many cases, particularly with external equipment such as radar sets and the like, the use of the simulation signals are static often required to determine the performance capabilities of the external equipment under test.

Figure 2:
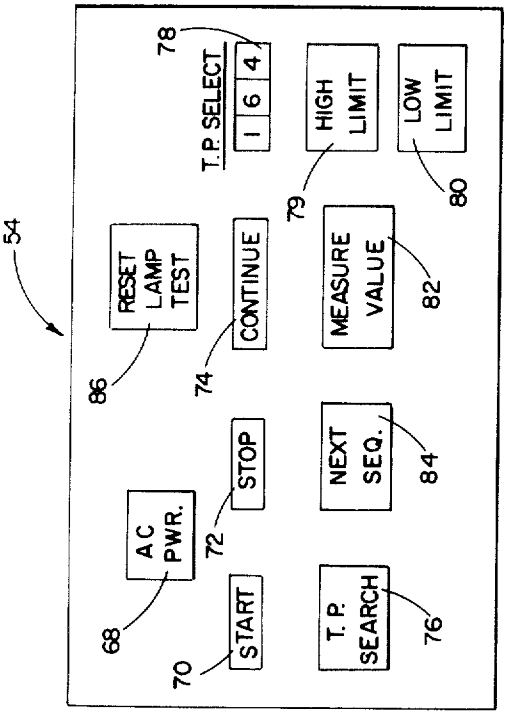
FIG. 2 is a front elevational view of a manual control box which forms part of the monitoring apparatus of the present invention.
Figure 3:
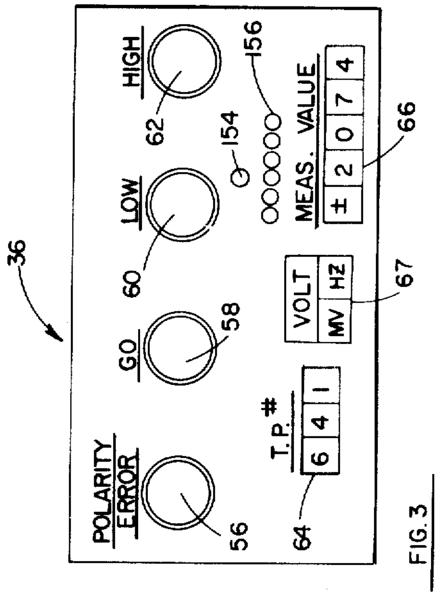
FIG. 3 is a front elevational view of an indicator panel forming part of the apparatus of the present invention.

The aforementioned components would all be included within a control housing (not shown) which is preferably constructed in the form of a portable unit so that it can be readily transported for use in on-line performance monitoring and fault-isolation on a locablized basis. This housing would normally include a front panel (also not shown) which would include a manual control box 54 (more fully illustrated in FIG. 2), along with the display indicator 36 (more fully illustrated in FIG. 3). The display indicator 36 would include a polarity indicator light 56 which displays the positive or negative polarity of a signal from any test point; a "Go" light 58 which displays the determination that a test measurement was established to be within the predetermined high and low tolerance data limits; a "low" indicator light 60 which displays the determination that the test measurement was established to be below the low tolerance data limit; and a "High" indicator light 62 which displays the determination that the test measurement exceeded the high tolerance data limit.

The display indicator 36 will normally include a plurality of display units, such as three display units 64 as illustrated, which provides a display of the test point number indicating the location of the test point measurement. In addition, the display indicator 36 also includes a plurality of display units, such as four display units 66 as illustrated, which provides a display of the actual measured value in digital form as established in the test measurement. These display units 64 and 66 may be in the form of conventional display devices, such as light-emitting-diode displays. A three segment light display 67 containing a volt light, a millivolt light designated as MV and a frequency light designated as Hz is also provided to determine the range of the direct readout on the units 66.

The manual control box 54 will normally include a manually operable push-button A.C. power switch 68 which is connected in conventional manner in order to initiate and interrupt power to the system. The control box 54 will also include a manually operable push-button start switch 70 and a manually operable push-button stop switch 72 which respectively, serve to initiate and terminate measurement operations. A manually operable push-button continue switch 74 on the control box 54 permits the operator to continue the measurement operation to the next selected test point. This switch is normally used when a NO-GO condition is detected at a test point which terminates further sequencing, and the operator wishes to continue sequencing through the remaining test points. In addition, a manually operable pushbutton test point search switch 76 is provided to initiate a test point searching. A manually rotatable multi-segment digi-switch 78 or so-called thumbwheel switch, is also mounted on the control box 54 in order to introduce the desired test point number. This digi-switch 78 will normally include a number of segments sufficient to cover the maximum number of test points which may be measured in accordance with the system described herein. Thus, by manually rotating a control dial on each of the segments of this digi-switch 78, the operator can manually introduce the desired test point number. After this test point number is introduced, actuation of the test point search switch 76 will initiate the measurement operation for a particular test point.

The manual control box 54 also includes a manually operable push-button high limit switch 78 and a manually operable push-button low limit switch 80 which can be manually operated by the operator of the system to provide either a display of the programmed high limit or a display of the programmed low limit of a test point designated by the push-buttom switch 78. Furthermore, the control box 54 also includes a manually operable measured value push button switch 82 which will permit the system to provide a measured value read-out on the display units 66. The manual control box 54 further includes a manually operable next sequence push button switch 84 which permits the operator to initiate the next sequence in test point measurements. This switch 84 serves as a type of jog control switch. A manually operable reset test push button switch 86 may also be provided on the control box 54 for resetting any of the components as desired. Each of the aforesaid switches may be conventionally provided with light transparent face plates and internal lights which will illuminate upon actuation of any of the switches.

Figure 4:
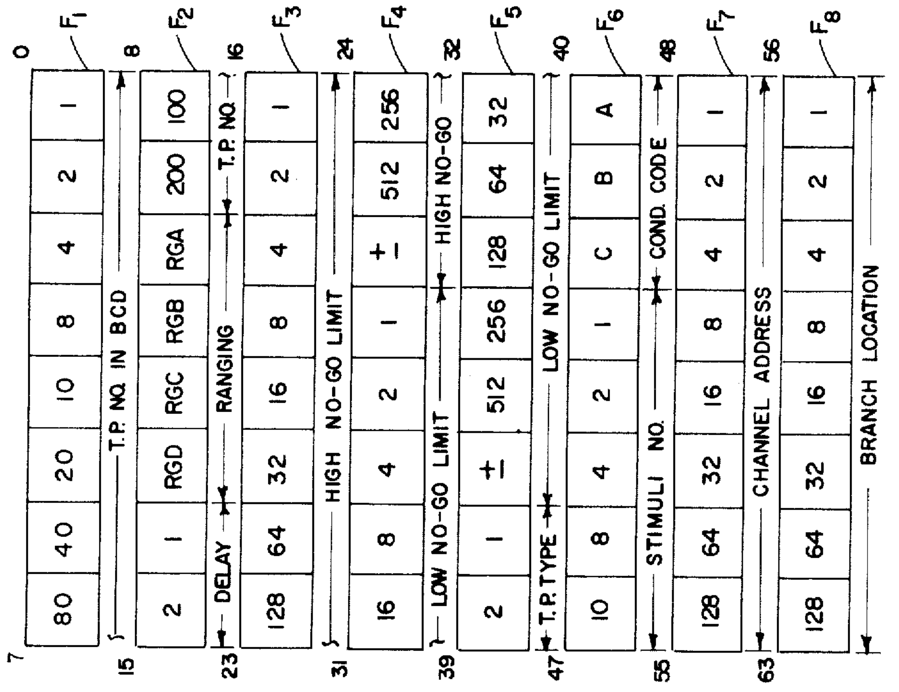
FIG. 4 is a schematic view illustrating the internal programming system forming part of the memory used in the apparatus of the present invention.

One typical memory organization for one of a basic capacity of 256 input channels is more fully illustrated in FIG. 4 of the drawings. This 64 bit information matrix describes the characteristics of each test point and is divided into several fields in the manner as illustrated in FIG. 4. The first of these fields designated as $F_1$ includes eight bits of the binary information which allows the operator of the system to group or assign test point numbers according to test point classification, sensor characteristics, sensor location, or the like. A second field designated as $F_2$ includes two bits which operate with the field $F_1$ and a four bit ranging field which defines one of the ten full scale ranges which may be programmed into the memory in the apparatus of the present invention. These ten ranges which can be used, for example, are 100 milivolts, 250 milivolts, 500 milivolts, 1 volt, 2.5 volts, 5 volts, 25 volts, 50 volts, and 100 volts full scale reading as illustrated in FIG. 4. Selection of the appropriate range according to the expected input signal magnitude provides maximum measuring resolution and accuracy, even for low level signals. A two-bit timing delay field is included in the memory field $F_2$, and specifies several discrete waiting intervals, such as four discrete waiting intervals, when a stimuli or simulation signal is to be activated. Accordingly, delay intervals of, for example, 1, 3, 10 or 60 seconds may be programmed into the memory as illustrated in FIG. 4. A high NO-GO limit field, designated as $F_3$, defines the criteria by which an abnormal or failure condition is judged. The three most significant bits in a memory field $F_4$ operate with the field $F_3$, the most significant bit of which operates to define polarity. Actually, the high NO GO limit is an eleven bit field including the sign bit plus ten magnitude bits. The memory also includes the memory field $F_4$ which serves as a low NO GO limit field, in FIG. 4 and is identical to the high NO Go limit field in meaning and structure, but generally applies only to the low threshold limits of a test point. The first eight most significant bit portion in a memory field $F_5$ also serves as part of the low NO GO field. The two bit positions designated as "T.P. Type" are used to determine the type of test point examination, as for example, a self check, pulse rate determination, conditional test or the like. The memory matrix also includes a memory field designated as $F_6$, which serves as a stimuli number field including a five bit number representing one of nineteen stimuli which may be activated. The binary number 0 is reserved to indicate that no stimulus is required and thereby inhibits the delay field from being applied. The three most significant bit positions of the field $F_6$ is a conditional code field. A channel address field, designated as $F_7$ represents any one of 256 input channels which may be selected. These input channels may be expanded to a total number of 512 channels by adding one bit, or expanded to 1,024 channels by adding two bits to the channel address. This channel address enables programmable random scanning of any input channels without requiring any external wiring changes to either the monitoring apparatus M or to the prime external equipment P. A branch location field, designated as $F_8$, provides an eight bit branch location to determine the absolute destination in which test sequence is to be branched, when conditions for branching are satisfied. In this connection, it can be observed since the memory 26 is preferably a read-only-memory, which is a random access device, the test points may be addressed in the memory in any desired sequence.

The timing and control circuit 22 and the operation thereof is more fully illustrated in FIG. 6 in schematic block diagram form and generally comprises a timing pulse generator 110 including an internal timing counter 112 which receives start-stop timing control signals in a manner to be hereinafter described. The generator 110 is provided with a number of timing outputs with binary designations 1, 2, 4, 8, $n$ , to a time control gating circuit 114, the latter also receiving the respective inputs from the instructional logic 40 as illustrated. The timing counter 112 included in the pulse generator 110 operates in conjunction with the time control gating circuit 114 and is capable of generating several timing pulses, and in the case of the present invention, is capable of generating up to 64 pulses. This timing counter 112 is preferably a resetable and preloadable binary counter which also receives a pre-load signal from the time control gating circuit 114 over a pre-load signal line 116.

The timing pulses which are generated at the output of the gating circuit 114 can be designated by octal numbers, as for example, from $T$=0 to $T$=77. The pulses $T$=00 , to $T$=77 are actually not individual trains of pulses but rather sequences of pulses in timed relationship which step the various circuits. Only certain of the timing signals will be described herein, since the signals can be altered as desired.

Figure 7:
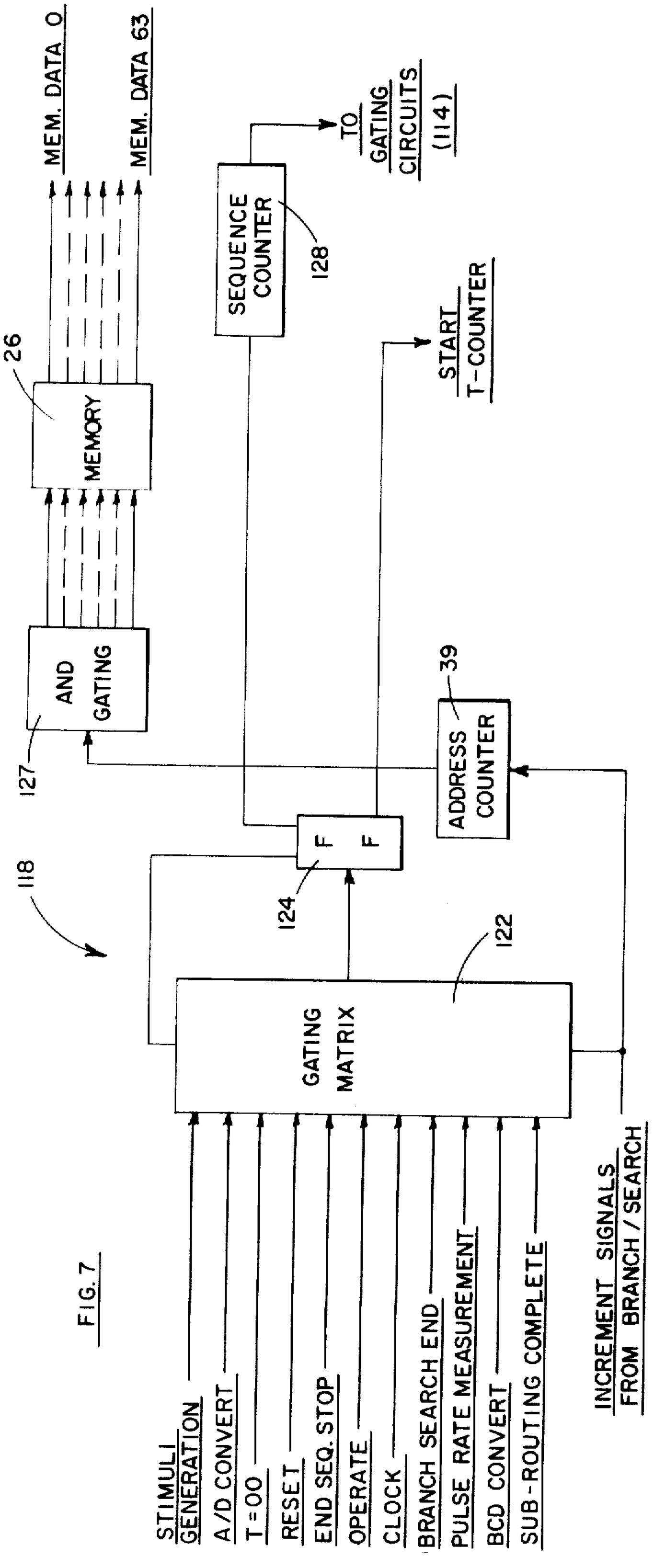
FIG. 7 is a schematic view, in block diagram form, showing a portion of the sequence control circuit forming part of the timing and control circuit used in the present invention.
Figure 6:
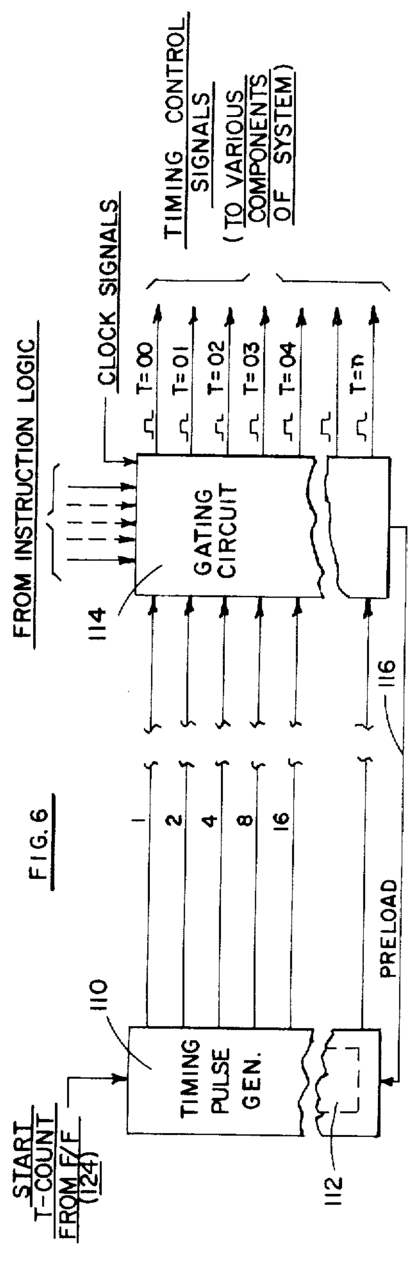
FIG. 6 is a schematic view, in block diagram form, showing the timing and control circuit used in the apparatus of the present invention.
Figure 10:
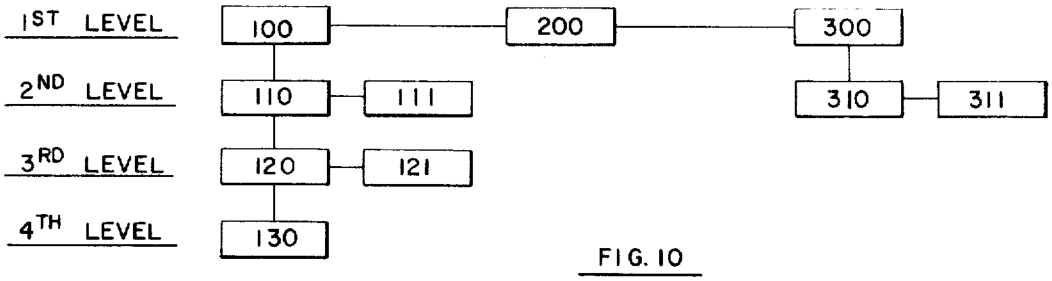
FIG. 10 is a schematic view illustrating the automatic test point sequence monitoring which is performed by the apparatus of the present invention.

As indicated in FIG. 6, $T$=00 is a master reset signal which causes all control flip-flops such as the flip-flops in the memory control circuit illustrated in FIG. 7, and various counters to be reset to the ready state, thereupon waiting a start command. The octal signal $T$–01 provides a no-operation state and as such does not disrupt the current status of any flip-flops or counters in the system. The octal signal $T$=02 is employed to increment the memory address counter 39 and therefore enables a 64 bit data for the next test point in the sequence to be addressed. An octal signal $T$=04 may be provided to control the display mode and conditional code processing in the apparatus of the present invention. An octal signal $T$=06 (not shown) is an interegating signal which may be provided to determine whether a stimulus is specified for the current status. An octal signal $T$=10 may be provided for a resetting counting control and transferring of timing control to the instructional logic 40. The time control gating circuit 114 thereupon provides the various timing control signals to the various components of the systems as illustrated in FIG. 1. There are several unused T pulse signals which exists and these are either allowed for circuit delay or reserved for functional expansion such as pass-limit processing, and the employment of copy printers and other peripheral equipment.

Figure 8:
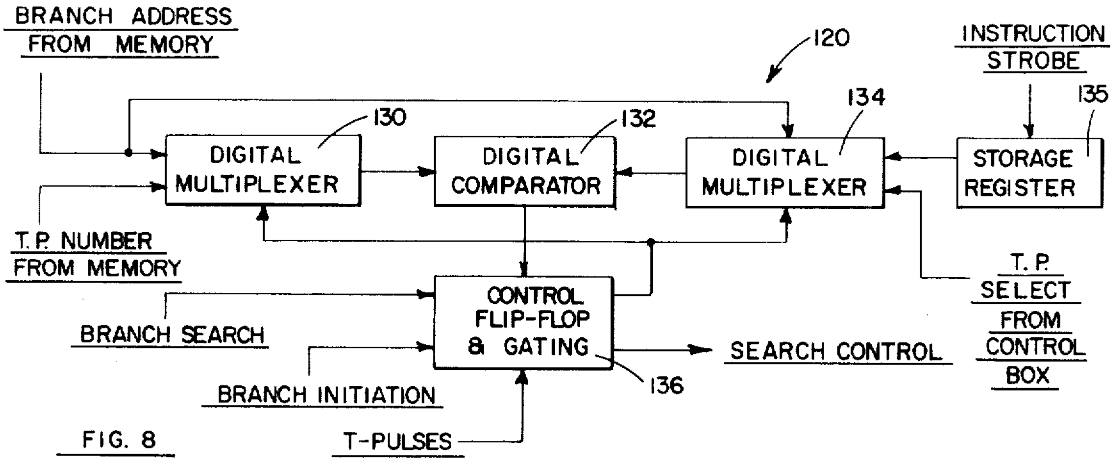
FIG. 8 is a schematic view showing a portion of the branch/search circuitry forming part of the timing and control circuit in the circuit of FIG. 1.

The timing and control circuit 22 includes as two major components thereof, a sequence control circuit 118 more fully illustrated in FIG. 7 and a branch search circuit 120 more fully illustrated in FIG. 8. The sequence control circuit 118 is designed to control the time sequencing of the various operations and the sequence in which the subsequent test points will be examined. The branch control circuit 120 operates in conjunction with the sequence control circuit 118 to control the determination of test points in branch operations.

The sequence control circuit 118 of the present invention as illustrated in FIG. 5, and generally comprises a gating matrix 122 which receives T=00 input signals, "reset" signals, "end-sequence-stop" signals, "analog-to-digital convert start/stop" signals, "pulse rate measurement start/stop" signals, "stimuli initiation start/-stop" signals, "clock" signals, "branch" or "search'-'signals, "sub-routine complete" signals, and "end-of-instruction" signals (*T*=77). The output of the gating matrix 122 is then introduced into a sequence control flip-flop 124. In like manner, the output of the flip-flop 124 is introduced into the T-counter 112 forming part of the timing pulse generator 110 to stop or start the timing counter as required by the various processing operations.

In general, the stepping of the timing counter 112 is stopped for operations which require more than one *T*-pulse period. Thus, for example, operations which require more than one *T*-pulse period are analog-to-digital conversion, pulse rate measurement, stimuli generation and application, branch operations, search operations, binary to BCD conversion, and the like. A variable waiting or delay period is effectively generated by preventing the stepping action of the timing counter 112 to enable sub-routine operations to be completed. At the completion of each such sub-routine, the applicable circuit will generate the end-of-operation signal which is utilized to energize the flip-flop 124 and reinitiate the operation of the timing counter 112, thus enabling the operational steps to continue.

By further reference to FIG. 7, it can be seen that the flip-flop 124 is provided with an output to a sequence counter 126 which, in turn, is operatively connected to the gating control circuit 114. The sequence counter 126 will initiate the sequence counting to aid in the determination of the next test point in sequence to be examined. In like manner, the flip-flop 124 is provided with an output to the T-counter 112 and an output to the address counter 39 which is combined with an increment signal from the branch/search circuit to be hereinafter described. It can also be observed that the output of the address counter 39 is connected to the remaining components of the memory 26 through an AND gating matrix 127. The AND gating matrix 127 has ten bit line outputs connected to the read only memory 26 and will provide the memory data signals as indicated in FIG. 7, namely Memory data 0, . . . Memory data 63.

The branch-search circuit 120 which is more fully illustrated in FIG. 8 of the drawings, generally comprises a digital multiplexer 130 which receives an *n*-bit branch address signal from the memory, and a test point number also derived from the memory. This multiplexer 130 will then provide an output to a digital comparator 132, which further receives a ten-bit address signal from another multiplexer 134 to generate a series of comparison outputs to a control flip-flop and gating matrix 136. The digital multiplexer 134 receives a ten-bit address from the test point selection on the control panel and an input from an N-bit branch point storage register 135. This storage register 135 will introduce the address information into the multiplexer 134 upon receipt of an instruction strobe from the instruction logic 40. In addition, the multiplexer 130 and the multiplexer 134 also receive branch or search initiation signals from an output of the flip-flop 136.

The control flip-flop 136 receives a branch start or initiation signal from the instruction logic 40 or a search start signal from the test point search switches on the control panel. The flip-flop 136 also receives a *T*-pulse input from timing and control circuit 22. Thus, when the control flip-flop 136 is properly energized, a branch or search control signal is generated for initiating the branch or searching operation. In essence, this control flip-flop 136 determines the state of the branch/search operation, and when the control flip-flop is in the set condition, the branch/search operation is completed.

Figure 9:
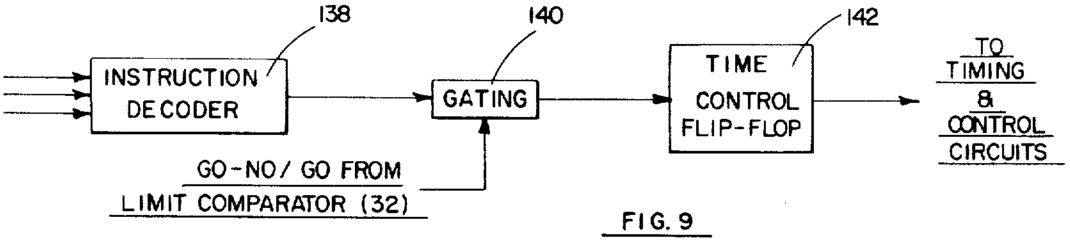
FIG. 9 is a schematic view illustrating the major components forming part of the instruction logic in the circuit of FIG. 1.

The major components of the instruction logic are more fully illustrated in FIG. 9 of the drawings, and include an instruction decoder 138 which receives three conditional codes from the control function data section 24 of the memory 26. This instruction decoder then generates an output to a gating matrix 140 which similarly receives the GO-NO/GO conditions from the limit comparator 32. The gating matrix 140 will thereupon provide an output to a time control flip-flop 142 which in turn generates a signal to the timing and control circuit 22.

In essence, the instruction logic 40 determines the sequence of various steps to be performed in the monitoring operations, and the timing and control circuit 22 determines the timing functions upon when these steps will be performed. In other words, the instruction logic 40 generates the signals which determines which functions will be performed, and the timing and control circuit determines when these functions will be performed. Referring again to FIG. 6, it can be observed that the T-pulse signals which are a series of timing pulses determine when the various functions will take place in sequence.

The apparatus of the present invention is capable of performing monitoring on various levels of test points in an established automatic monitoring sequence. One such test point classification is illustrated in FIG. 7 and shows four levels of test points which can be examined in accordance with the process and apparatus of the present invention. In order to perform the automatic multi-level sequence monitoring, the monitoring apparatus M uses a branching and control circuit which is included primarily in the instruction logic 40 and the selector switching device 14. This branching and control circuit obtains the measurement range from the read-only-memory 26, under the control of the timing control circuit 22, and thereby enables the appropriate test point selection circuitry in the selector switching device 14.

Considering the test point classification of FIG. 7, the various blocks labeled 100 through 311 represent test points which provides information descriptive of the performance characteristics of the major sub-systems in any prime external equipment P. Thus, the test point 100 would represent a test point identification location of a major sub-system and the test points 110 and 111 would represent test point identification locations of sub-sub-systems. In like manner the test points 120 and 121 represent a third level of an even smaller sub-system and the fourth level test point 130 represents a subcomponent of the sub-system 120. Thus, the value of the test point 100 is first measured and automatically compared to threshold performance limits which are stored in the memory 26. Normally, if the value of the major test point 100 is between the high and low limits, i.e., renders a GO condition, the next major test point 200 will be monitored, and in like manner, if the test point 200 is within the normal low and high limits, the next subsequent major test point 300 will be measured. Alternatively, if the test point 100 is either above the high limit or below the low limit to render a NO-GO condition, the next subtest point 110, subordinate to the test point 100, will be monitored. If the test point 110 is NO-GO, then the test point 111 will be monitored, if the test point 110 is GO, the test point 120 will be monitored. In like manner, assuming that the test point 120 rendered a GO condition, the test point 130 would be examined and so forth. It can be observed that this sequence of tests is established so that a failure or improper action of a component which effects system level performance will first be detected at the system performance level, and the cause of the degraded system level performance will be automatically located by examining parameters in the chain of effects of the components which caused the failure or improper action.

The apparatus of the present invention includes two selftest sub-systems, the first of which performs a measurement capability check of various components, and the second of which is capable of measuring performance of the entire system during actual monitoring operations. The first test subsystem is generally included in the selector switching device 14 and is also more fully illustrated in FIG. 5 of the drawings. This sub-system 120 includes a test signal source 150 which provides a D.C. signal or a pulse rate signal, and would be normally included within the selector switching device 14 as aforesaid. The output of this test signal source 150 which is connected across the plurality of switches 15 which are automatically operable for closing and opening and provides a common output to the scaling amplifier 18 over the conductor 20 in the manner as illustrated in FIGS. 1 and 5. Normally, a switch 15 will be included for each component in which a measurement capability check is to be made. In this connection, the signals generated by the test signal source 150 are derived from the various components such as power supplies and the like in order to determine if these components are operating in proper condition. A malfunction of these components would immediately become apparent in that the apparatus will stop and indicate an internal fault is detected on the self-test display if internal performance measurements do not meet the performance criteria.

A second test sub-system, in the form of a logic malfunction indicator circuit 152, is connected across the timing and control circuit 22 and the instruction logic 40 in the manner as illustrated in FIG. 1. This malfunction indicator circuit 152 receives a plurality of sequence control outputs from the timing and control circuit 22 in the manner as illustrated in FIG. 1 of the drawings.

This malfunction indicator circuit 152 generally determines which part of the system, if any, is malfunctioning. In normal operations, the time counter 112 in the timing pulse generator 110 will normally stop operating during certain functions, such as analog-to-digital conversion. These various components in the system generate signals informing of the termination of the particular operation. Thus, when the analog-to-digital conversion operation is taking place, the T-counter 112 is stopped and will reinitiate counting again when a signal is received that the conversion operation has been completed. Furthermore, during the period of time in which counting has ceased, a counting indicator light 154 which is mounted on the control panel 136 (FIG. 3) will be energized.

If for some reason, a termination signal is not received as, for example, at the end of an analog-to-digital conversion, an indication of a malfunction is present. The logic malfunction indicator circuit 152 generally comprises an illegal timing counter stop circuit (not shown) which determines whether the stopping of the timing counter 112 is a normal stop during performance of the sub-routine operation or an abnormal stop which indicates that the applicable circuit now has failed to carry out its required sub-routine performance to completion.

A series of malfunction indicator lights 156 are also mounted on the control panel 36, and receives outputs from the logic malfunction indicator circuit 152 for energization of the same to indicate malfunction of the applicable circuit. By reference to FIG. 1, it can be observed that the logic malfunction indicator circuit 152 is provided with a selfcheck light output which is in turn connected to the light 154 on the panel 136, and an error signal light output which is connected to the various error signal lights 156 on the control panel 36. One of the self-check error signal lights 156 will be illuminated when a malfunction does occur, and in this way, the operator can quickly determine which component of the system has malfunctioned.

The operation of the aforementioned monitoring system has been described in connection with the foregoing system description. However, for further explanation of the operation, it can be observed that the monitoring system will successively measure the outputs from the sensors and transducers 10 which are connected to the various test points *O* on the prime external equipment P. These outputs constitute measured values which are compared to the predetermined high and low limits to render GO and NO-GO decisions. The test points can be assigned limiting values and classified into different types of levels as indicated above to establish the automatic monitoring sequence. Accordingly, it can be observed that the monitoring system will locate the cause of failure or improper performance by fault-isolation.

The application of a stimuli from the control function section data 22 into the prime external equipment P can be performed so that testing with the monitoring apparatus M would not interfere with normal operation of the prime external equipment P. For example, a simulated load can be introduced into a radar unit in order to enable the measurement of output power. This can be performed by programming anyone of the several stimuli control lines 50 with a waiting period from 1 to 60 seconds, for example, for the response of a particular stimuli function and before the resultant measurement is made.

In order to perform the various measurements the operator will energize the system by actuating the A.C. power switch 68. Thereafter, actuation of the reset switch 80 will provide an initiating signal to the internal logic and permits proper operating condition of displays and indicators located on the various front panels of the system. In order to initiate the operation, the operator will actuate the start switch 70 to start a test run on a manual basis, and the apparatus will indicate that testing is in process when the switch is illuminated. In like manner, the operator can stop the test at any time by manual actuation of the stop switch 72. When a failure of the prime equipment is isolated, the apparatus M will automatically stop further testing to display the out of limit conditions. The continue switch 74 may be actuated by the operator to continue the testing of the rest of the sequence if desired. The test point search switch 76, when actuated, will initiate a search to the test point previously selected and thereby measure and display the status of the selected test point. The next sequence switch 84, when actuated, provides for manually stepping through the test sequence, making a measurement and displaying a status of each point in the entire sequence. The measured value and the high and low limit switches on the control box provide for selection of the measured value as well as the high limit and low limit to the test point to be displayed. In like manner, the display switch pemits numeric displays according to test number and test point value. This status display will provide for high conditions, low conditions, polarity conditions, and GO and NO-GO conditions, as well as engineering units such as volt, millivolt, or pulse rate.

Thus, there has been illustrated and described a novel automatic monitoring and fault-isolation system which is also capable of providing for manual selection of any test point to be measured, providing the measured value in the form of a readout along with the high and the low limits, and which can be used in a wide variety of applications. Accordingly, the system of the present invention fulfills all of the objects and advantages sought therefore. Many changes, modifications, variations and other uses and applications of the subject system will become apparent to those skilled in the art after considering this specification and the accompanying drawings. Therefore, all such changes, modifications, variations and other uses and applications which do not depart from the spirit and scope of the invention are deemed to be covered by the invention which is limited only by the following claims.

Having thus described my invention, what I desire to claim and secure by letters patent is:

1. An apparatus for automatically monitoring primary signals and secondary signals at a plurality of test points on a system to be tested, and where said system provides primary test point signals from primary aspects of said system at each of said test points and secondary test point signals from secondary aspects of said system at certain of said test points, and which secondary test point signals are associated with and subordinate to the primary test point signals from the test points at which they are provided; said apparatus comprising:

a. means for receiving test point signals from the system to be tested at selected test points thereon, b. signal conditioning means for selectively generating a single output from said test point signals and converting the output to words of digital data, c. memory means including a section for storing high pre-established tolerance limit data and low pre-established tolerance limit data for comparison against the test point signals provided at said respective test points, and a control function data section, d. comparator means operatively connected to said memory means and said signal conditioning means for comparing each word of digital data as an output of said signal conditioning means with the stored high pre-established tolerance limit data and the stored low pre-established tolerance limit data, e. time control means operatively connected to said signal conditioning means and said memory means for causing said signal conditioning means to select said test point signals in sequence and to enable comparison against said pre-established tolerance limit data and determining whether a signal is within tolerance limits or out of tolerance limits, f. and instruction means operatively connected to said time control means and said comparator means for enabling a determination of whether the next test point signal to be examined is a secondary test point signal associated with a primary test point signal previously examined or a next primary test point signal in sequence and selecting the next of the primary or secondary signals to be examined, said determination and selecting depending upon the respective determination made by said comparator means of the test point signal immediately previously examined.

2. The apparatus of claim 1 further characterized in that said apparatus comprises presentation means for producing a GO or NO-GO condition based on the respective determination made by said comparator means depending on whether said signal is within tolerance limits or out of tolerance limits.

3. The apparatus of claim 2 further characterized in that said presentation means is a visual display means capable of providing a visual display of said GO or NO-GO conditions.

4. The apparatus of claim 3 further characterized in that said display means comprises at least one display member for indicating the magnitude of a test point signal at a test point and at least one display member for indicating the identification of a test point corresponding to a NO GO determination.

5. The apparatus of claim 4 further characterized in that said apparatus comprises means for causing said display means to indicate in sequence the NO GO determinations, if any, from any test points examined in sequence.

6. The apparatus of claim 1 further characterized in that said apparatus comprises sequence control means operating in conjunction with said time control means and said instruction means for enabling selection of a primary test point signal for next examination if a previous primary test point signal was within the tolerance limits established by the high tolerance limit data and the low tolerance limit data and for enabling selection of a secondary test point signal for next examination if the previous primary test point signal was not within the tolerance limits established by the high tolerance limit data and the low tolerance limit data.

7. The apparatus of claim 6 further characterized in that said sequence control means operates in conjunction with said time control means and said instruction means to enable all successive secondary test point signals associated with a primary test point signal to be examined sequentially when previous secondary test point signals are not within the tolerance limits established by the high tolerance limit data and the low tolerance limit data.

8. The apparatus fo claim 7 further characterized in that said apparatus comprise branch and search means which is operatively associated with and operates in conjunction with said sequence control means to enable the determination by said instruction means of whether the next primary test point signal is to be examined sequentially or the successive secondary test point signals associated with a primary test point signal is to be next examined sequentially.

9. The apparatus of claim 1 further characterized in that said time control means permits synchronization of the tolerance limit data with the corresponding word of digital data generated from any test point signal at a sequencing rate of at least of the order of 15 to several hundred test points per second.

10. The apparatus of claim 1 further characterized in that said apparatus comprises display means for selectively indicating any one of the low tolerance limit data, high tolerance limit data, signal magnitude, signal polarity and engineering units for any selected test point, and display means for indicating the identification of the test point.

11. The apparatus of claim 1 further characterized in that said memory means comprises a read only memory, and includes a section containing high tolerance limit data in the form of multi-bit binary words and low tolerance limit data in the form of multi-bit binary words, and where at least one of the bits in each word represents sign and the remaining bits represent magnitude.

12. The apparatus of claim 1 further characterized in that said signal conditioning means comprises an analog-to-digital converter for generating binary information for polarity and amplitude measurement and for generating binary information for pulse rate measurement.

13. The apparatus of claim 1 further characterized in that said time control means comprises a timing pulse generator generating a plurality of separate pulse trains representing test operating conditions, and a sequence control circuit receiving said last named pulse trains and also receiving signals from said instruction means to produce at its output timing control signals.

14. The apparatus of claim 1 further characterized in that said apparatus comprises internal test checking means for automatically initiating a test check of the operation of said apparatus, said test checking means being operatively connected to and receiving outputs from said time control means and said instruction means.

15. The apparatus of claim 1 further characterized in that said apparatus comprises generating means for generating and introducing stimuli signals in the system to be tested to enable the generation of test point signals by the system to be tested and at the test points on the system to be tested.

16. The apparatus of claim 1 further characterized in that said signal conditioning means comprises selector switching means for selectively coupling the generated test point signals at a plurality of input connections to a single output, and converter means operatively connected to the output of said selector switching means for converting the signals to digital data.

17. A method for automatically monitoring primary signals and secondary signals at a plurality of test points on a system to be tested, and where said system provides primary test point signals from primary aspects of said system to be tested at each of said test points and secondary signals from secondary aspects of said system at certain of said test points, and which secondary test point signals are associated with and subordinate to the primary test point signals from the test points at which they are provided; said method comprising:

a. generating test point signals from said system,
b. selectively coupling the generated test point signals in sequence,
c. generating a single output from the selectively coupled test point signals,
d. converting selected ones of said coupled signals to words in a digital data format,
e. storing pre-established high tolerance limit data and storing pre-established low tolerance limit data in a storage member,
f. storing control function data related to the steps of said method in the storage member,
g. comparing the words in digital data format from the converted coupled signals with the pre-established high tolerance limit data and the pre-established low tolerance limit data in synchronism with the tolerance limit data delivered from the storage member,
h. determining whether the words in digital data format are within the tolerance limits established by the pre-established high tolerance limit data and the pre-established low tolerance limit data upon instruction commands generated in conjunction with the control function data in said storage member,
i. generating a GO condition if such words are within such tolerance limits, and generating a NO GO condition if such words are not within such tolerance limits based on said comparison and determination,
j. automatically determining whether the next test point signal to be examined is a secondary test point signal associated with a primary test point signal previously examined or a next primary test point signal in sequence, based on said comparison and the generating of the GO or NO GO conditions, and
k. automatically selecting the next of the primary or secondary signals to be examined depending on the respective determination of whether previous test point signal generated a GO or NO GO condition.

18. The method of claim 17 further characterized in that the method comprises displaying the magnitude and polarity of a test point signal provided at a test point and displaying a test point identification corresponding to a NO-GO determination for a test signal at such a test point.

19. The method of claim 17 further characterized in that said method comprises selecting a primary test point signal for next examination if the previous primary test point signal was within tolerance limits established by the high and low tolerance limit data corresponding to a GO determination and selecting a secondary test point signal associated with the previous primary test point signal if the primary test point signal was not within tolerance limits established by the high and low tolerance limit data corresponding to a NO GO determination.

20. The method of claim 17 further characterized in that the method further comprises comparing the tolerance limit data with the corresponding word of digital data generated from any test point signal on a synchronized basis at a sequencing rate of at least of the order of fifteen to several hundred test points per second.

21. The method of claim 17 further characterized in that the storage member is a read only memory, and that the method further comprises converting the coupled signals to words in digital data format, and further that the high tolerance limit data exists in the form of multi-bit binary words and the low tolerance limit data exists in the form of multi-bit binary words, and where at least one of the bits in each word represents sign and the remaining bits represent magnitude.

22. An apparatus for automatically monitoring test point signals at a plurality of test points on a system to be tested, said apparatus comprising:

a. means for receiving test point signals from the system to be tested at selected test points thereon, b. selector switching means operatively connected to said last named means and having a plurality of input connections from said last named means for selectively coupling the generated test point signals to a single output, c. converter means operatively connected to the output of said selector switching means for converting the signals from the single output of said selector switching means to words of digital data, d. memory means including a section for storing high pre-established tolerance limit data and low pre-established tolerance limit data for comparison against the test point signals provided at said respective test points, and a control function data section, e. comparator means operatively connected to said memory means and said converter means for comparing words of digital data from said converter means with stored high pre-established tolerance limit data and the stored low pre-established tolerance limit data, f. time control means generating a first set of time control signals operatively connected as an input to said selector switching means for causing said selector switching means to couple test point signals from said input connections to said converter means in sequence, said time control means generating a second set of time control signals operatively connected as an input to said memory means for causing said memory means to introduce tolerance limit data to said comparator means synchronized with corresponding words of digital data introduced to said comparator means from said converter means, said comparator means thereby enabling comparison of the words of digital data against the tolerance limits established by said high pre-established tolerance limit data and the tolerance limits established by said low pre-established tolerance limit data for determining whether a signal is within tolerance limits or out of tolerance limits, g. instruction means operatively connected to said time control means and said comparator means for determining a selected next test point in sequence to be examined, h. presentation means operatively connected to said comparator means for producing a GO condition or a NO-GO condition depending upon the respective determination by said comparator means, i. and internal test checking means operatively connected to and receiving outputs from said instruction means and said time control means for automatically monitoring and initiating test checks of the operation of said apparatus to establish proper performance.

23. The apparatus of claim 22 further characterized in that said apparatus comprises means for examining the high pre-established tolerance limit data and the low pre-established tolerance limit data from said memory means, one test point at a time, at locations in said memory means corresponding to the respective test points.

24. The apparatus of claim 23 further characterized in that said apparatus comprises second test checking means and includes a test signal generator, and selector switching means is also operatively connected to said second test checking means and receives test signals from said test signal generator.

25. The apparatus of claim 22 further characterized in that said apparatus comprises second test checking means including test signal generating means connected to and provides test signals to said selector switching means, said selector switching means including an individual actuable switch for each of the components in said apparatus to be tested and which components are operatively connected to the associated individual actuable switch in said second test checking means.

26. The apparatus of claim 22 further characterized in that the test point signals from the system to be tested are plural level test point signals where certain of said test point signals are major test point signals and certain of said test point signals are sub-test point signals, said apparatus comprising means for automatically monitoring each of said major test point signals and automatically monitoring sub-test point signals associated with said major test point signals when said last named major test point signals renders a NO GO condition.

27. The apparatus of claim 22 further characterized in that said internal test checking means comprises a logic malfunction indicator circuit, a plurality of energizable devices, energizable selectively upon a malfunction, and means for automatically stopping the sequences of said apparatus upon a malfunction thereof.

28. The apparatus of claim 22 further characterized in that said time control means permits synchronization of the tolerance limit data with the corresponding word of digital data generated from any test point signal at a sequencing rate of at least of the order of 15 to several hundred test points per second.

29. The apparatus of claim 22 further characterized in that said memory means comprises a read only memory, and includes a section containing high tolerance limit data in the form of multi-bit binary words and low tolerance limit data in the form of multi-bit binary words, and where at least one of the bits in each word represents sign and the remaining bits represent magnitude.

30. In a data acquisition apparatus of the type which monitors signals from an independently operable system and which data acquisition apparatus comprises a memory device containing a section of high pre-established tolerance limit data and low pre-established tolerance limit data establishing tolerance limits for said signals, selector switching means to couple the signals from the independently operable source, conversion means operatively connected to said selector switching means to receive the coupled signals and convert said signals to words of digital data comparator means operatively connected to the conversion means to receive the words of digital data for comparing these words of digital data with the pre-established tolerance limits, timing control means operatively connected to said selector switching means and said memory device to generate such comparison on a synchronized basis, time pulse generating means within said timing control means for generating time control pulses, counter means within said timing control means to initiate start and stop commands, and instruction means operatively connected to said timing control means and said comparator means to select the next of the signals to be examined in sequence; the improvement comprising first internal test checking means operatively connected to said timing control means for receiving time control pulses from said pulse generating means and start and stop commands from said counter means, and said instruction means also being operatively connected to and generating sequence instruction signals for input to said first internal checking means for automatically monitoring the the operation of said data acquisition apparatus for proper performance, said counter means being operatively connected to said time pulse generating means and issuing a stop command to stop counting during conversion of a coupled signal to a word of digital data, and said counter means issuing a start command and reinitiating counting when such conversion has been completed, second internal test checking means including a plurality of actuable switches associated with said selector switching means, each one of said actuable switches being operatively connected to a component in said apparatus to be test checked on a periodic basis, said second internal test checking means including test signal generating means operatively connected to and periodically operating said selector switching means for initiating a test check of the components connected to the switches in said selector switching means and for comparing responses to a generated function in said components.

31. The improvement in the data acquisition apparatus of claim 30 further characterized in that said plurality of individual switches are automatically actuable and said test signal generating means is operatively connected to each of said individual switches for selectively initiating a test check of any one or more of the components of said apparatus.

32. The improvement in the data acquisition apparatus of claim 30 further characterized in that said data acquisition apparatus comprises amplifier means operatively interposed between said selector switching means and said comparator means, and wherein said amplifier means scales the coupled signals to a desired range for conversion.

33. The improvement in the data acquisition apparatus of claim 30 further characterized in that said timing control means of said apparatus permits synchronization of the tolerance limit data with the corresponding word of digital data generated from any test point signal at a sequencing rate of at least of the order of 15 to several hundred test points per second.

34. The improvement in the data acquisition apparatus of claim 30 further characterized in that said memory devices comprises a read only memory, and includes a section containing high tolerance limit data in the form of multi-bit binary words and low tolerance limit data in the form of multi-bit binary words, and where at least one of the bits in each word represents sign and the remaining bits represent magnitude.

35. A method for automatically monitoring test point signals in a non-programmable self-contained apparatus and which test point signals are generated at a plurality of test points on an external system to be tested; said method comprising:

a. generating test point signals from said system,
b. selectively coupling in sequence the generated test point signals,
c. converting selected ones of said signals to words in digital data format,
d. storing high pre-established tolerance limit data and low pre-established limit data to establish high and low tolerance limits in a storage member,
e. comparing the tolerance limits established by the high and low tolerance limit data with the words of digital data in sequence and on a synchronized basis with the data delivered from said storage member, presenting a GO or NO GO condition based on said comparison,
f. generating timing signal pulses to enable the comparing of the tolerance limit data with the words of digital data on the synchronized basis,
g. counting the timing signal pulses as they are generated,
h. stopping the counting of the timing signal pulses during the conversion of a signal to a word of digital data format,
i. generating a termination signal at the end of the conversion operation and reinitiating the counting of the timing signal pulses,
j. generating sequence control signals for normal sequence of operations in said apparatus,
k. determining if the stopping of the counting is normal or abnormal in accordance with the sequence control signals to thereby determine if the apparatus is properly operating,
l. generating a plurality of test signals and connecting these signals across a plurality of switches which are connected to certain components in said apparatus to be tested,
m. and periodically automatically opening and closing said switches to internally check certain of the the components in said apparatus for proper performance.

36. The method of claim 35 further characterized in that the method comprises displaying the magnitude and polarity of a test point signal provided at a test point on the external system and displaying a test point identification corresponding to a NO GO determination for a test point signal at such a test point.

37. The method of claim 35 further characterized in that certain of the test point signals are major test point signals and certain of the test point signals are sub-test point signals, and wherein the method comprises automatically monitoring each of said major test point signals and automatically monitoring sub-test point signals associated with major test point signals when said last named major test point signal renders a NO GO condition.

38. The method of claim 35 further characterized in that the method further comprises comparing the tolerance limit data with the corresponding word of digital data generated from any test point signal on a synchronized basis at a sequencing rate of at least of the order of fifteen to several hundred test points per second.

39. The method of claim 35 further characterized in that the storage member is a read only memory, and that the method further comprises converting the coupled signals to words in digital data format, and further that the high tolerance limit data exists in the form of multi-bit binary words and the low tolerance limit data exists in the form of multi-bit binary words, and where at least one of the bits in each word represents sign and the remaining bits represent magnitude.

40. An apparatus for automatically monitoring primary signals and secondary signals at a plurality of test points on a system to be tested, and where said system provides primary test point signals from primary aspects of said system at each of said test points and secondary test point signals from secondary aspects of said system at certain of said test points, and which secondary test point signals are associated with and subordinate to the primary test point signals from the test points at which they are provided; said apparatus comprising:

a. means for receiving test point signals from the system to be tested at selected test points thereon, b. signal conditioning means for selectively generating a single output from said test point signals and converting the output to words of digital data, c. memory means for storing pre-established tolerance limit data for signals at said respective test points, d. comparator means operatively connected to said memory means and said signal conditioning means for comparing each word of digital data as an output of said signal conditioning means with the stored tolerance limit data, e. time control means operatively connected to said signal conditioning means and said memory means for causing said signal conditioning means to select said test point signals in sequence and to enable comparison against said pre-established tolerance limit data and determining whether a signal is within tolerance limits or out of tolerance limits, f. means operatively associated with said time control means to permit synchronization of the tolerance limit data with the corresponding digital data generated from any test point signal at a sequencing rate of at least of the order of 15 to several hundred test points per second, g. and instruction means operatively connected to said time control means and said comparator means for enabling a determination of whether the next test point signal to be examined is a secondary test point signal associated with a primary test point signal previously examined or a next primary test point signal in sequence and selecting the next of the primary or secondary signals to be examined depending upon the respective determination made by said comparator means of the test point signal immediately previously examined.

* * * * *